United States Patent
Yin et al.

(10) Patent No.: US 10,915,540 B2
(45) Date of Patent: Feb. 9, 2021

(54) METHOD AND SYSTEM FOR EVALUATING USER PERSONA DATA

(71) Applicant: TENCENT TECHNOLOGY (SHENZHEN) COMPANY LIMITED, Shenzhen (CN)

(72) Inventors: Hongjun Yin, Shenzhen (CN); Jihong Zhang, Shenzhen (CN); Lei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

(21) Appl. No.: 16/006,156

(22) Filed: Jun. 12, 2018

(65) Prior Publication Data
US 2018/0300376 A1 Oct. 18, 2018

Related U.S. Application Data

(63) Continuation of application No. PCT/CN2017/097455, filed on Aug. 15, 2017.

(30) Foreign Application Priority Data

Aug. 18, 2016 (CN) .......................... 2016 1 0683111

(51) Int. Cl.
*G06F 16/2458* (2019.01)
*G06F 16/28* (2019.01)
(Continued)

(52) U.S. Cl.
CPC ............ *G06F 16/2465* (2019.01); *G06F 7/08* (2013.01); *G06F 16/2365* (2019.01);
(Continued)

(58) Field of Classification Search
None
See application file for complete search history.

(56) References Cited

U.S. PATENT DOCUMENTS 9,235,848 B1    1/2016  Gourley et al.
9,462,313 B1 *  10/2016 Sbaiz ................. H04N 21/6582
(Continued)

FOREIGN PATENT DOCUMENTS

| CN | 103258054 A | 8/2013 |
| CN | 104239351 A | 12/2014 |

(Continued)

OTHER PUBLICATIONS

EPO Communication dated Apr. 10, 2019 including Supplementary European search Report in European Patent Application No. EP 17841024—8 pages.

(Continued)

*Primary Examiner* — Uyen T Le
(74) *Attorney, Agent, or Firm* — Oblon, McClelland, Maier & Neustadt, L.L.P.

(57) ABSTRACT

A method and an apparatus are provided. Distribution information in a first attribute dimension is acquired from a persona data collection of users who use a network service. The persona data collection includes persona data sets corresponding to the users. An evaluation data collection to match the distribution information in the first attribute dimension is extracted from a sample data collection that is collected from sample users. The sample data collection includes sample data sets corresponding to the sample users. Further, a level of accuracy of the persona data collection in a second attribute dimension is determined based on the evaluation data collection in the second attribute dimension.

20 Claims, 4 Drawing Sheets

(51) Int. Cl.
*G06F 16/23* (2019.01)
*G06Q 30/02* (2012.01)
*G06F 7/08* (2006.01)
*G06Q 10/00* (2012.01)

(52) U.S. Cl.
CPC .......... *G06F 16/285* (2019.01); *G06Q 10/00* (2013.01); *G06Q 30/02* (2013.01); *G06Q 30/0201* (2013.01); *G06Q 30/0254* (2013.01); *G06F 2216/03* (2013.01)

(56) References Cited

U.S. PATENT DOCUMENTS

| | | | |
|---|---|---|---|
| 2004/0199418 A1 | 10/2004 | Hertz et al. | |
| 2006/0259473 A1 | 11/2006 | Li et al. | |
| 2007/0112585 A1 | 5/2007 | Breiter et al. | |
| 2007/0239522 A1* | 10/2007 | Kunz | G06Q 30/02 705/14.66 |
| 2009/0043714 A1* | 2/2009 | Zhao | G06F 16/2462 706/11 |
| 2010/0010872 A1* | 1/2010 | Drummond | G06Q 10/0637 705/7.36 |
| 2012/0185494 A1* | 7/2012 | Garmon | G06Q 30/02 707/758 |
| 2013/0073335 A1* | 3/2013 | Tang | G06Q 30/02 705/7.29 |
| 2015/0156030 A1 | 6/2015 | Fadell et al. | |
| 2015/0170029 A1* | 6/2015 | Otsuka | G06N 3/08 706/21 |
| 2015/0324811 A1* | 11/2015 | Courtright | G06Q 30/02 705/7.32 |
| 2016/0103996 A1* | 4/2016 | Salajegheh | G06F 11/3024 726/25 |
| 2016/0189201 A1* | 6/2016 | Shao | G06Q 30/0243 705/14.42 |

FOREIGN PATENT DOCUMENTS

| | | |
|---|---|---|
| CN | 104317790 A | 1/2015 |
| CN | 105574159 A | 5/2016 |
| WO | WO 2005/020788 A2 | 3/2005 |

OTHER PUBLICATIONS

EPO Communication pursuant to Rules 70(2) and 70a(2) EPC dated Apr. 29, 2019 in European Patent Application No. EP 17841024—1 page.

Chinese Office Action dated Jan. 6, 2020 in Chinese Patent Application No. 2016106831116 with Concise Explanation of Relevance for Chinese Office Action 1 in English , 8 pages.

International Search Report dated Nov. 23, 2017 in PCT/CN2017/097455, with English translation, 6 pages.

* cited by examiner

METHOD AND SYSTEM FOR EVALUATING USER PERSONA DATA

RELATED APPLICATION

This application is a continuation of International Application No. PCT/CN2017/097455, filed on Aug. 15, 2017, which claims priority to Chinese Patent Application No. 201610683111.6, entitled "Method and System for Evaluating User Persona Data", filed with the Chinese Patent Office on Aug. 18, 2016. The entire disclosures of the prior applications are hereby incorporated by reference in their entirety.

FIELD OF THE TECHNOLOGY

This application relates to a field of data mining.

BACKGROUND OF THE DISCLOSURE

Compared with conventional off-line member management and questionnaire investigation, mega-data technology enables enterprises to acquire multi-aspect information of users conveniently via Internet and learn behavior and consumption habits of users more precisely. User persona acquired by mega-data mining can be applied in precision marketing and market-oriented promotion of enterprises. User persona is an abstracted user model obtained through classifying and labeling collected user information. User persona can include categories to which various information of users belong, for example, the user persona of a user can include female, Beijing, born in 1980s, white collar, liking American TV series, having children, liking Lancome, and so on.

SUMMARY

The embodiments of this application provide a method and a system for evaluating user persona data, and sample data can be used to evaluate an accuracy rate of user persona data.

Aspects of the disclosure provide a method. Distribution information in a first attribute dimension is acquired from a persona data collection of users who use a network service. The persona data collection includes persona data sets corresponding to the users. An evaluation data collection to match the distribution information in the first attribute dimension is extracted from a sample data collection that is collected from sample users. The sample data collection includes sample data sets corresponding to the sample users. Further, a level of accuracy of the persona data collection in a second attribute dimension is determined based on the evaluation data collection in the second attribute dimension.

Aspects of the disclosure provide an apparatus. The apparatus includes interface circuitry and processing circuitry. The interface circuitry receives a persona data collection of users who use a network service. The interface circuitry also receives a sample data collection that is collected from sample users. The processing circuitry acquires, from the persona data collection, distribution information in a first attribute dimension. The persona data collection includes persona data sets corresponding to the users. The processing circuitry extracts, from the sample data collection, an evaluation data collection to match the distribution information in the first attribute dimension. The sample data collection includes sample data sets corresponding to the sample users. Further, the processing circuitry determines a level of accuracy of the persona data collection in a second attribute dimension based on the evaluation data collection in the second attribute dimension.

Aspects of the disclosure provide a non-transitory computer-readable storage medium storing a program executable by a processor. Distribution information in a first attribute dimension is acquired from a persona data collection of users who use a network service. The persona data collection includes persona data sets corresponding to the users. An evaluation data collection to match the distribution information in the first attribute dimension is extracted from a sample data collection that is collected from sample users. The sample data collection includes sample data sets corresponding to the sample users. Further, a level of accuracy of the persona data collection in a second attribute dimension is determined based on the evaluation data collection in the second attribute dimension.

In each embodiment of this application, evaluation data consistent with distribution of user persona data is selected from a sample data set, so that the extracted evaluation data has representativeness for user persona data, and an evaluation result is more impersonal and accurate.

DESCRIPTION OF EMBODIMENTS

Figure 1A:
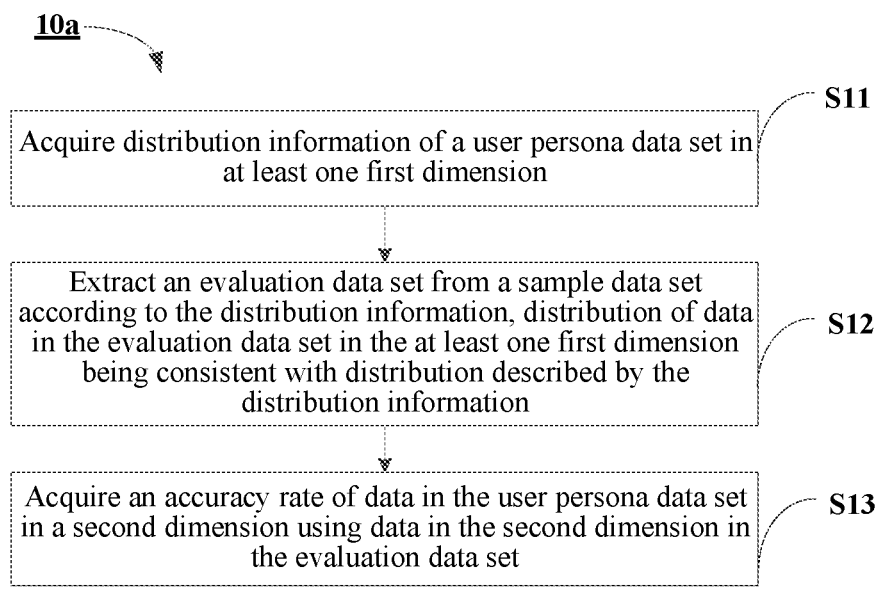
FIG. 1a is a flowchart of a method for evaluating user persona data.

Each embodiment of this application provides a method for evaluating user persona data that screens sample data according to a distribution condition of user persona data in a certain dimension (or attribute dimension) or some dimensions to acquire evaluation data of which distribution is consistent with distribution of the user persona data, and evaluates an accuracy rate of persona data in another dimension using the evaluation data. In an embodiment, a dimension (for example, an attribute dimension) refers to a certain attribute of users, for example, age, gender, birth place, location, education background, occupation, hobby, income situation, and the like. In an embodiment, a dimension (for example, an attribute dimension) can refer to a suitable combination of certain attributes of users, for example, age, gender, birth place, location, education background, occupation, hobby, income situation, and the like. FIG. 1a is a flowchart of a method for evaluating user persona data. As shown in FIG. 1a, the method 10a can include the following steps.

In step S11, acquire distribution information of a user persona data set in at least one first dimension.

In step S12, extract an evaluation data set from a sample data set according to the distribution information, distribution of data in the evaluation data set in the at least one first dimension being consistent with distribution described by the distribution information.

In step S13, acquire an accuracy rate of data in the user persona data set in a second dimension using data in the second dimension in the evaluation data set.

Figure 1B:
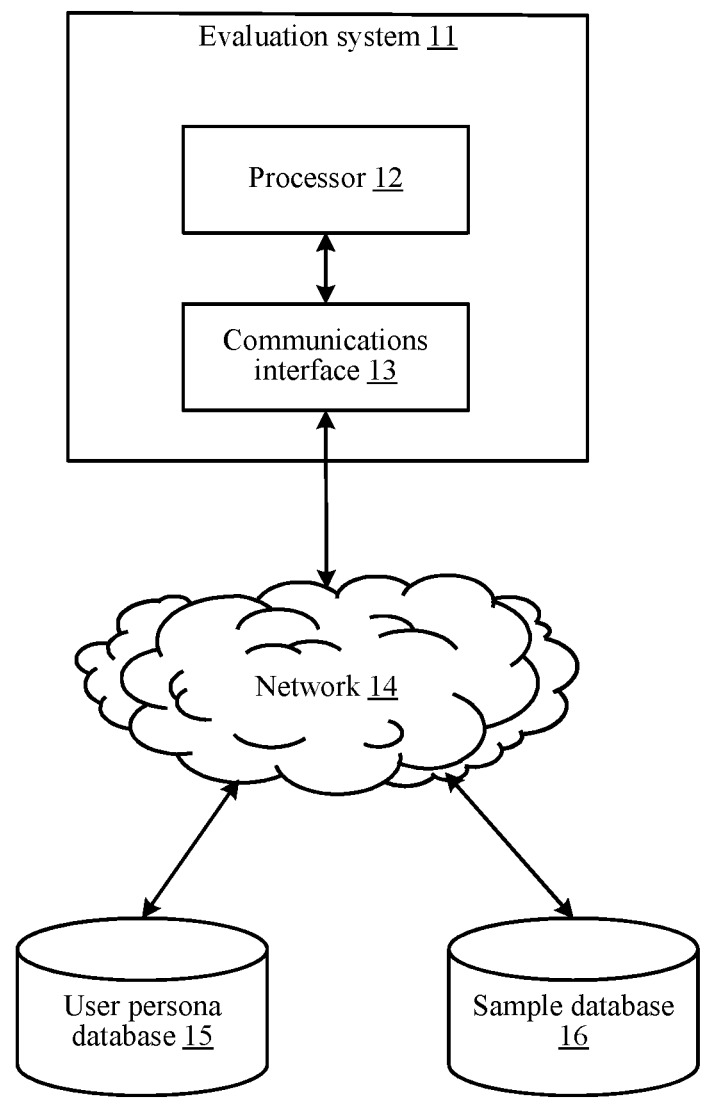
FIG. 1b shows a system according to one embodiment of this application.

The method in various embodiments in this application can be performed by a system for evaluating persona data. FIG. 1b shows a system according to one embodiment of this application. As shown in FIG. 1b, the system 10b includes an evaluation system 11, a user persona database 15, a sample database 16, and a grid 14. The evaluation system 11 includes one or more computation devices, for example, a server and a server cluster. Therefore, the evaluation system 11 can include one or more processors 12 and one or more communications interfaces 13. In some embodiments, at least one of the user persona database 15 and the sample database 16 can also be located in a device of the evaluation system 11.

In this application, user persona data set refers to a set of persona data of multiple users. Persona data of one user includes multi-dimensional information of the user, for example, user identifier, age, gender, birth place, location, educational background, occupation, hobby, and income situation. The user persona data set may be a set formed of user persona data extracted by a certain network service provider (for example, providers of instant communications service, social contact network service, network payment service, and online shopping service) from user information of users. User information can be registration information filled by users when registering for a network service, or user behaviors collected by service providers. User identifiers can be identity and contact information (for example, telephone numbers and E-mail addresses) of users, and user accounts (for example, instant communications account, social contact account, network payment service account, and shopping website account) registered by users in a server of a network service provider.

In the embodiments of this application, the sample data set refers to a data set of multiple users as samples. User data in the sample data set may be different from data in a user persona data set in terms of sources. For example, the sample data set can contain user data collected by an entrusted research company through survey, user data obtained through questionnaire investigation, or data in an Enterprise Customer Relationship Management System (CRM).

The evaluation data set is a set of user data extracted from the sample data set according to a distribution situation of a user persona data set in a first dimension. In some examples, the user data in the evaluation data set and the user persona data in the user persona data set have the same distribution in the first dimension. Dimension refers to a certain attribute of users, for example, age, gender, birth place, location, education background, occupation, hobby, and income situation. For example, if age, gender, and location are selected as the first dimensions, user data is extracted from a sample data set according to the distribution situations of data in a user persona data set in age, gender, and location, so as to form an evaluation data set that has a consistent distribution in the dimensions of age, gender, and location.

In each embodiment of this application, evaluation data consistent with distribution of user persona data is selected from a sample data set, so that the extracted evaluation data has representativeness for user persona data, and an evaluation result is more impersonal and accurate.

Figure 2:
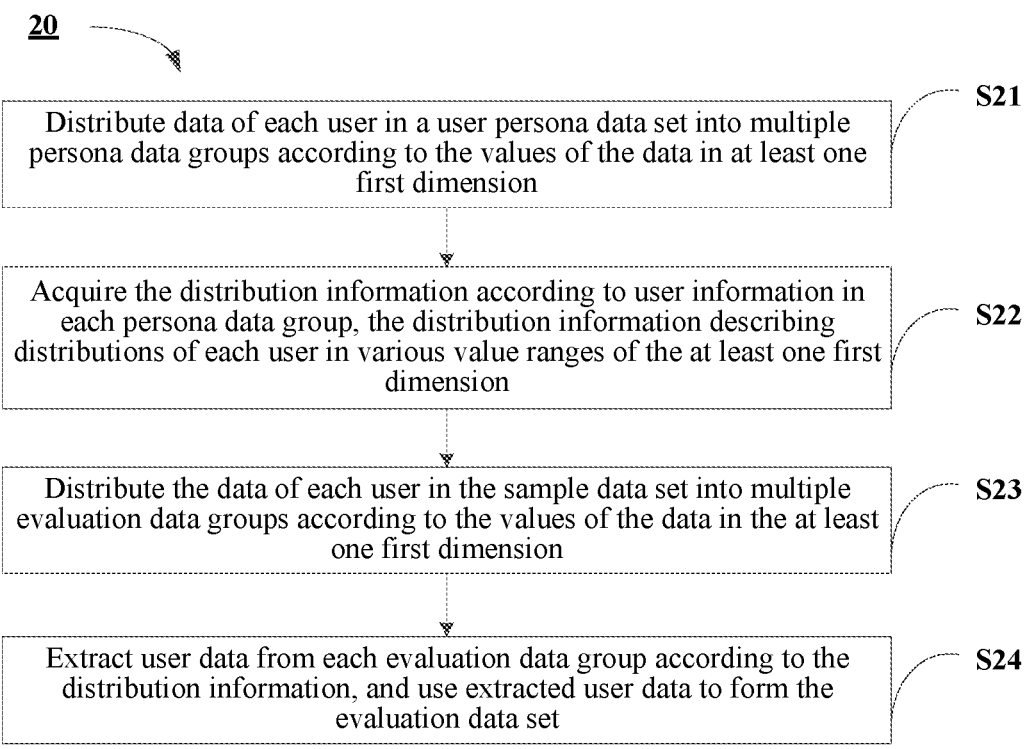
FIG. 2 is a flowchart of a method for extracting an evaluation data set from a sample data set.

In order to ensure the screened evaluation data to have representativeness, some examples use layered sampling and coordinated sampling to extract evaluation data from the sample data set. FIG. 2 is a flowchart of a method for extracting an evaluation data set from a sample data set. As shown in FIG. 2, the method 20 includes the following steps.

In step S21, distribute data of each user in a user persona data set into multiple persona data groups according to the values of the data in at least one first dimension.

The multiple persona data groups are corresponding to different value ranges.

In some examples, the value range of each first dimension can be divided into multiple sections, multiple layers are determined by using different combinations of each section of each first dimension, and each layer is corresponding to a different value range of each first dimension. The sum of layers is equal to a product of the numbers of sections of each first dimension. For example, when the first dimensions are gender, two layers can be determined and respectively correspond to different values of gender, that is, male and female; when the first dimensions are gender and age, if gender is divided into two sections (male and female), and age is divided into three sections (below 20, from 20 to 50, and over 50), and the first dimensions can be divided into six layers, each layer is corresponding a different combination of sections of gender and age, that is, male below 20, male from 20 to 50, male over 50, female below 20, female from 20 to 50, and female over 50. In each embodiment of this application, the number of layers can be determined by factors such as evaluation precision, sampling cost, sampling difficulty, and computation complexity according to actual demand.

After layers are determined, the persona data of each user in the user persona data set can be distributed into multiple persona data groups based on the values of the first dimension according to value ranges corresponding to each layer, and each persona data group is corresponding to one layer.

In step S22, acquire the distribution information according to user information in each persona data group, the distribution information describing distributions of each user in various value ranges of the at least one first dimension.

In step S23, distribute the data of each user in the sample data set into multiple evaluation data groups according to the values of the data in the at least one first dimension.

The multiple evaluation data groups are corresponding to different value ranges.

In some examples, the user data in the sample data set can be grouped in the same layering manner as grouping of user persona data. At this time, each persona data group and each evaluation data group are in a one-to-one correspondence relationship, and a persona data group and an evaluation data group that are in a correspondence relationship having a same or corresponding value range. The corresponding value range refers to that the expression modes of a value range or values therein are different, and they can be converted according to a certain rule.

In some other examples, the data in the sample data set can also be grouped by using a layering method different from grouping of persona data. At this time, the persona data groups and the evaluation data groups can have a one-to-many relationship or many-to-one relationship, and the value ranges can have an including or included relationship.

In step S24, extract user data from each evaluation data group according to the distribution information, and use extracted user data to form the evaluation data set.

In some examples, the distribution information describes numbers of users distributed in various value ranges of the at least one first dimension. Step S24 can include:

determining a sampling proportion according to numbers of users distributed in various value ranges and a number of users in each evaluation data group;

determining a number of users that need to be extracted from an evaluation data group corresponding to each value range according to the numbers of users distributed in the various value ranges and the sampling proportion.

In some examples, the number of users that need to be extracted from an evaluation data group corresponding to each value range can be equal to a product of the number of users in the persona data group corresponding to each evaluation data group and the sampling proportion.

For example, three first dimensions are selected, for example, gender, age, and location. The number of sections of the age dimension is A, the number of sections of gender dimension is G, and the number of sections of location dimension is L, so the total number of layers is A×G×L. According to the distribution proportion of the user persona data in each layer (that is, persona data group), the number of users that need to be extracted from each layer (that is, evaluation data group) of sample data is calculated and then each evaluation data group is sampled randomly.

It is assumed that the number of users in the sample data set is M, the number of users in the user persona data set is N, M>{A,G,L} and M>A×G×L. Theoretically, the users can be sampled according to the proportion of the number of users in the persona data group in the number of users in the user persona data set, and the number of samples extracted from each evaluation data group is:

$$M_{A_iG_jL_k} = \text{round}\left(\frac{N_{A_iG_jL_k}}{N} \times M\right)$$

$A_iG_jL_k$ represents a layer corresponding to an age section i, a gender section j, and a location section k, and $N_{A_iG_jL_k}$ represents the number of users in the persona data group corresponding to the layer $A_iG_jL_k$.

In an actual situation, a lot of user persona data may possibly be distributed in a certain layer, while less or even no such user persona data is distributed in the sample data set, so sampling cannot be directly performed according to the aforementioned method, and the sampling proportion needs to be adjusted according to a distribution situation of users in the sample data set, so as to extract an evaluation data set that is consistent with the distribution of user persona data.

In some examples, the method for adjusting a sampling proportion can include: arranging ratios of the number of users in each evaluation data group to the number of users in a corresponding persona data group in a descending order and taking a first ratio at a preset position as a sampling proportion.

In some examples, the first ratio at the preset position is a minimum value, that is, the last ratio when arranging ratios of the number of users in each evaluation data group to the number of users in a corresponding persona data group in a descending order, or the first ratio when arranging ratios of the number of users in each evaluation data group to the number of users in a corresponding persona data group in an ascending order. For example, a certain layer corresponding to a particularly small number of users in the sample data set becomes a sampling bottleneck. It is assumed that the number of users in the layer is $M_0$, the ratio of the number of users in the layer to the number of users in the persona data group corresponding to the layer is $$\frac{M_0}{N_0}, \frac{M_0}{N_0} = \min\left(\frac{M_p}{N_p}\right), M_p$$

is the number of users corresponding to the layer p in the sample data set (that is, the number of users in the evaluation data group p), and $N_p$ is the number of users corresponding to the layer p in the user persona data set (that is, the number of users in the persona data group p). The sampling number of each layer can be reduced by $$\frac{M_0}{N_0}$$

in the same proportion according to the sampling bottleneck, so as to ensure that the sampled evaluation data set and user persona data set have consistent distribution. In this example, the final sampling number of each evaluation data group is $$R_p = \frac{M_0}{N_0} \times N_p.$$

In some examples, the sample data set may possibly have one or more layers, and the number of corresponding users is particularly small or even is zero, with a result that sampling cannot be performed. At this time, these layers may be neglected, after ratios of the number of users in each evaluation data group to the number of users in a corresponding persona data group are arranged in a descending order, the first ratio at the preset position is taken as the sampling proportion. For example, a minimum value in the ratios in the preset proportion, that is, a ratio in the preset proportion when arranging ratios corresponding to each evaluation data group in a descending or ascending order, may be taken, for example, when arranging in a descending order, a minimum value in the first 80% ratios is taken (for example, when 100 ratios are arranged in a descending order, the minimum value in the first 80% ratios is taken, that is, the 100*80%=80$_{th}$ ratio is taken). If the ratio is $$\frac{M_0}{N_0},$$

the final sampling number of each evaluation data group is $$R_p = \frac{M_0}{N_0} \times N_p.$$

The number of users is smaller than layers of sampling quantity, and all user data can be extracted as the evaluation data in the evaluation data set.

In some examples, the method for adjusting the sampling proportion includes: taking a smaller value in two values as a sampling proportion:

a ratio of the preset number of expected samples to the number of users in the user persona data set;

a ratio at the preset position after arranging ratios of the number of users in each evaluation data group to the number of users in a corresponding persona data group in a descending order.

An expected sampling capacity refers to a preset total number of samples that are expected to be extracted.

It is assumed that the total number of users in the user persona data set is N=Σ$N_p$, and the expected sampling capacity is EM=ΣEM$_p$. The number of users in each layer in each data set is described in Table 1

TABLE 1

Number of users in each layer in each data set

| Number of users in each layer of persona | Ratio of users in each layer of persona | Expected number of layered users | Number of users of the sample layer | Number of users actually extracted from each sample layer |
|---|---|---|---|---|
| $N_1$ | $N_1/N$ | $EM_1 = \frac{N_1}{N} \times EM$ | $M_1$ | $R_1 = \min\left(\frac{M_q}{EM_q}\right) \times EM_1$ |
| $N_2$ | $N_2/N$ | $EM_2 = \frac{N_2}{N} \times EM$ | $M_2$ | $R_2 = \min\left(\frac{M_q}{EM_q}\right) \times EM_2$ |
| $N_3$ | $N_3/N$ | $EM_3 = \frac{N_3}{N} \times EM$ | $M_3$ | $R_3 = \min\left(\frac{M_q}{EM_q}\right) \times EM_3$ |
| ... | ... | ... | ... | ... |
| $N_p$ | $N_p/N$ | $EM_p = \frac{N_p}{N} \times EM$ | $M_p$ | $R_p = \min\left(\frac{M_q}{EM_q}\right) \times EM_p$ |

An expected number of samples at a certain layer is $$EM_p = \frac{N_p}{N} \times EM.$$

The sample data set has a certain layer at which the number of users is very small, recoded as $M_0$, and a ratio of it to an expected number of samples $$EM_0 \text{ is } \frac{M_0}{EM_0}, \frac{M_0}{EM_0} = \min\left(\frac{M_q}{EM_q}\right),$$

and the layer is a sampling bottleneck. The expected number $EM_p$ of samples at each layer needs to be reduced at the same proportion according to the sampling bottleneck, so as to ensure the samples and the user persona data are distributed at the same layer. Therefore, the final sampling number of each layer is $$R_p = \min\left(\frac{M_q}{EM_q}\right) \times EM_p.$$

The sampling bottleneck can be deduced and reduced as:

$$R_p = \min\left(\frac{M_q}{EM_q}\right) \times EM_p = \min\left(\frac{M_q}{\frac{N_q}{N} \times EM}\right) \times \frac{N_p}{N} \times EM = \min\left(\frac{M_q}{N_q}\right) \times N_p$$

It can be concluded that the final sampling proportion is determined by $$\min\left(\frac{M_q}{N_q}\right).$$

The expected sampling proportion is $$\frac{EM}{N}.$$

If $$\frac{EM}{N} \leq \min\left(\frac{M_q}{N_q}\right),$$

the sampling proportion may not be adjusted and is still $$\frac{EM}{N},$$

and the sampling number of the evaluation data group corresponding to each layer is $$R_p = \frac{EM}{N} \times N_p.$$

If $$\frac{EM}{N} > \min\left(\frac{M_q}{N_q}\right),$$

the sampling proportion can be adjusted to be $$\min\left(\frac{M_q}{EM_q}\right),$$

and the sampling number of the evaluation data group corresponding to each layer is $$R_p = \min\left(\frac{M_q}{N_q}\right) \times N_p = \frac{M_0}{N_0} \times N_p.$$

In some examples, one or more layers may exist in the sample data set, and the number of corresponding users is particularly small or even is zero, with a result that sampling cannot be performed. At this time, the layers can be neglected, a first ratio at the preset position after arranging ratios of the number of users in each evaluation data group to the number of users in a corresponding persona data group in a descending order is taken, and the sampling proportion is adjusted according to the first ratio. For example, a minimum value in each ratio in the preset proportion, that is, a ratio in the preset proportion when arranging ratios corresponding to each evaluation data group in a descending or ascending order, is taken as the first ratio, for example, when arranging in a descending manner, the minimum value in the first 80% ratios is taken.

It is assumed that the first ratio is $$\frac{M_0}{N_0}$$

and the expected sampling proportion is $$\frac{EM}{N}.$$

If $$\frac{EM}{N} \leq \frac{M_0}{N_0},$$

the sampling proportion may not be adjusted and is still $$\frac{EM}{N},$$

and the sampling number of the evaluation data group corresponding to each layer is $$R_p = \frac{EM}{N} \times N_p.$$

If $$\frac{EM}{N} > \frac{M_0}{N_0},$$

the sampling proportion can adjusted to be $$\frac{M_0}{N_0},$$

and the sampling number of the evaluation data group corresponding to the each layer is $$R_p = \frac{M_0}{N_0} \times N_p.$$

That is to say, the sampling quantity of the evaluation data group corresponding to each layer is $$R_p = \min\left(\frac{EM}{N}, \frac{M_0}{N_0}\right) \times N_p.$$

Figure 3:
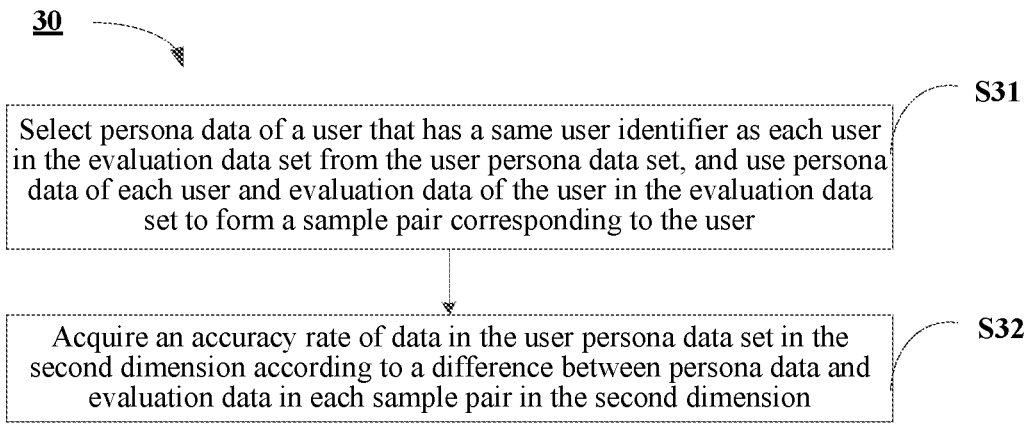
FIG. 3 is a flowchart of a method for evaluating an accuracy rate of data in a user persona data set.

FIG. 3 is a flowchart of a method for evaluating an accuracy rate of data in a user persona data set. As shown in FIG. 3, the method 30 includes the following steps.

In step S31, select persona data of a user that has a same user identifier as each user in the evaluation data set from the user persona data set, and use persona data of each user and evaluation data of the user in the evaluation data set to form a sample pair corresponding to the user.

In each embodiment of this application, since the user persona data set is a set of user persona data of all users of a certain service, the sample data set acquired by the provider of the service is a user data set acquired for the users of the service, and each user in the evaluation data set has corresponding persona data in the user persona set. Therefore, each user in the evaluation data set can be used as a sample, and the difference between the persona data and the evaluation date serves as a judgment basis for persona data of a whole user group.

In step S32, acquire an accuracy rate of data in the user persona data set in the second dimension according to a difference between persona data and evaluation data in each sample pair in the second dimension.

In some examples, the difference is compared with the preset threshold, and the accuracy rate is determined according to a comparison result. For example, if the difference is larger than a threshold, the accuracy rate of the user persona data is determined to be low; if the difference is smaller or equal to the threshold, the accuracy rate of the user persona data is determined to be high.

The difference can be obtained using a hypotheses testing algorithm or an accuracy rate algorithm. The hypotheses testing algorithm can include a parameter hypotheses testing algorithm, a non-parameter hypotheses testing algorithm, for example, a Z testing algorithm, a T testing algorithm, an F testing algorithm, and a ratio testing algorithm. The parameter hypotheses testing algorithm is suitable for a situation that the value of data is a continuous value, and the non-parameter hypotheses testing algorithm is suitable for a situation that the value of data is a discrete value.

The parameter hypotheses testing algorithm can acquire the correlation coefficient of each sample pair as follows:

$$r = \frac{\sum (x_i - \bar{x})(y_i - \bar{y})}{\sqrt{\sum (x_i - \bar{x})^2 \sum (y_i - \bar{y})^2}}$$

$x_i$ represents persona data of a user i, $y_i$ represents evaluation data of a user i, $\bar{x}$ is an average value of persona data of each user, and $\bar{y}$ is an average value of evaluation data of each user. For simple description, the values of the persona data and the evaluation data in the second dimension are called as persona data and evaluation data in the following description.

In some examples, the difference between persona data and evaluation data in each sample pair in the second dimension can be the difference of an average value of the persona data and an average value of the evaluation data in the second dimension. At this time, a significance testing method for average value difference may be used.

For example, when the significance testing method for average value difference uses a Z testing algorithm, the standard error for the persona data and the evaluation data in the sample pair is:

$$SE_{nx} = \sqrt{\frac{S_1^2}{n} + \frac{S_2^2}{n} - 2r\frac{S_1}{\sqrt{n}} \times \frac{S_2}{\sqrt{n}}}$$

$S_1^2$ represents a variance of persona data, $S_2^2$ represents a variance of evaluation data, n represents a total number of users in an evaluation data set, and r represents a correlation coefficient obtained from above.

The Z testing for testing consistence of average value differences of the sample pair is:

$$Z = \frac{|D_X - \mu_{DX}|}{SE_{nx}}$$

$D_X$ represents an average value of differences between x and y, x is a vector formed by persona data of each user, y is a vector formed by evaluation data of each user, and $\mu_{DX}$ represents a hypothetical average value of $D_X$.

$$Z = \frac{|\sum x_i - \sum y_i|}{\sqrt{\sum(x_i - \bar{x})^2 + \sum(y_i - \bar{y})^2 - 2\sum(x_i - \bar{x})(y_i - \bar{y})}}$$
$$= \frac{|\sum(x_i - y_i)|}{\sqrt{\sum(x_i - \bar{x})^2 + \sum(y_i - \bar{y})^2 - 2\sum(x_i - \bar{x})(y_i - \bar{y})}}$$

When the tolerance difference is Δ, the aforementioned computation method for the value Z can be processed as follows:

when abs($x_i - y_i$)≤Δ, it is considered ($x_i - y_i$)=0;
when abs($x_i - y_i$)>Δ, ($x_i - y_i$)=($x_i - y_i$).

A bilateral test critical value of a confidence degree α is preset as $Z_{\alpha/2}$. If $|Z| > Z_{\alpha/2}$, it can be determined that persona data is significantly different from evaluation data, and the accuracy rate of user persona data is low; if $|Z| \leq Z_{\alpha/2}$, it can be determined that persona data is not significantly different from evaluation data, and the accuracy rate of user persona data is high.

In some examples, in each sample pair, the difference between persona data and evaluation data in the second dimension can be the difference between the variance of the persona data and the variance of the evaluation data in the second dimension. At this time, the difference significance test of the between variances may be used.

For example, T test can be performed according to the following algorithm:

$$t = \frac{|S_1^2 - S_2^2|}{\sqrt{\frac{4S_1^2 S_2^2(1-r^2)}{n-2}}}$$

$$= \frac{|\sum(x_i - \bar{x})^2 - \sum(y_i - \bar{y})^2|}{\sqrt{\frac{4}{n-2} \times (\sum(x_i - \bar{x})^2 \sum(y_i - \bar{y})^2 - (\sum(x_i - \bar{x})(y_i - \bar{y}))^2)}}$$

$S_1^2$ represents a variance of persona data, $S_2^2$ represents a variance of evaluation data, n represents a total number of users in an evaluation data set, and r represents a correlation coefficient obtained from above.

Look up the table t with the free degree n−2. If t is larger than a critical value, the two variances have a significance difference, it is determined that the difference between persona data and evaluation data is significant, and the accuracy rate of the user persona data is low; and if t is smaller than or equal to the critical value, it is determined that the difference between the persona data and the evaluation data is not significant, and the accuracy rate of the user persona data is high.

In some examples, the difference between persona data and evaluation data in each sample pair in the second dimension may be the difference between the percentage of various values of the persona data in the second dimension and the percentage of various values of various values of the evaluation data. At this time, the non-parameter hypotheses testing algorithm can be used.

In some examples, when the value of the second dimension is a discrete value, for example, the gender values are male and female, the nation values are different nations, the nationality values are different nationalities, physical state values are healthy and unhealthy, and furthermore, for example, school record, ability level, and attitude to a certain problem. The values of these user attributes are not in a relationship of large or small quantities, and refer to different categories. The classification data can use a method such as a percentage significance testing method.

For example, the McNemar testing method in the percentage significance testing method can be used.

An McNemar testing matrix is generated according to persona data and evaluation data in each sample pair. When the data has two possible values, the McNemar testing matrix is shown in Table 2.

TABLE 2

McNemar testing matrix

| | | Persona data | | |
|---|---|---|---|---|
| | | Value 1 | Value 2 | Total |
| Evaluation value | Value 1 | $n_{11}$ | $n_{12}$ | $d_1$ |
| | Value 2 | $n_{21}$ | $n_{22}$ | $d_2$ |
| Total | | $c_1$ | $c_2$ | n |

Value 1 and value 2 are two possible values of the data in the second dimension, for example, male/female and liking/not liking. $n_{ij}$ (=1, 2) is the number of users of value 1 and value 2 of persona data and evaluation data in each sample pair.

$$Z = \frac{n_{12} - \frac{1}{2} \times (n_{12} + n_{21})}{\sqrt{(n_{12} + n_{21}) \times \frac{1}{2} \times \frac{1}{2}}} = \frac{n_{12} - n_{21}}{\sqrt{n_{12} + n_{21}}}$$

A bilateral test critical value of a confidence degree $\alpha$ is preset as $Z_{\alpha/2}$. If $|Z|>Z_{\alpha/2}$, it can be determined that persona data is significantly different from evaluation data, and the accuracy rate of user persona data is low; if $|Z|\leq Z_{\alpha/2}$, it can be determined that persona data is not significantly different from evaluation data, and the accuracy rate of the user persona data is high.

In some examples, the difference of persona data and evaluation data in a sample pair in the second dimension can be the difference between a first data group formed by data of persona data of each user in each of the sample pairs in the second dimension and a second data group formed by data of the evaluation data of each user in the second dimension. At this time, the accuracy rate of persona data can be measured according to an overall difference degree between persona data and evaluation data in each sample pair.

For example, for second dimension data with a continuous value, the formula of accuracy rate is as follows:

$$\rho = \frac{\||D_1 - D_2| \leq \Delta\|}{\|D_1\|}$$

For second dimension data with a discrete value, the formula of accuracy rate is as follows:

$$\rho = \frac{\||D_1 - D_2| = 0\|}{\|D_1\|}$$

$D_1$ represents a vector formed by the persona data of each user in each sample pair, $D_2$ represents a vector formed by evaluation data of each user in each sample pair $\Delta$ represents an error that can be tolerated, and $\|\ \|$ represents 0 norm.

Figure 4:
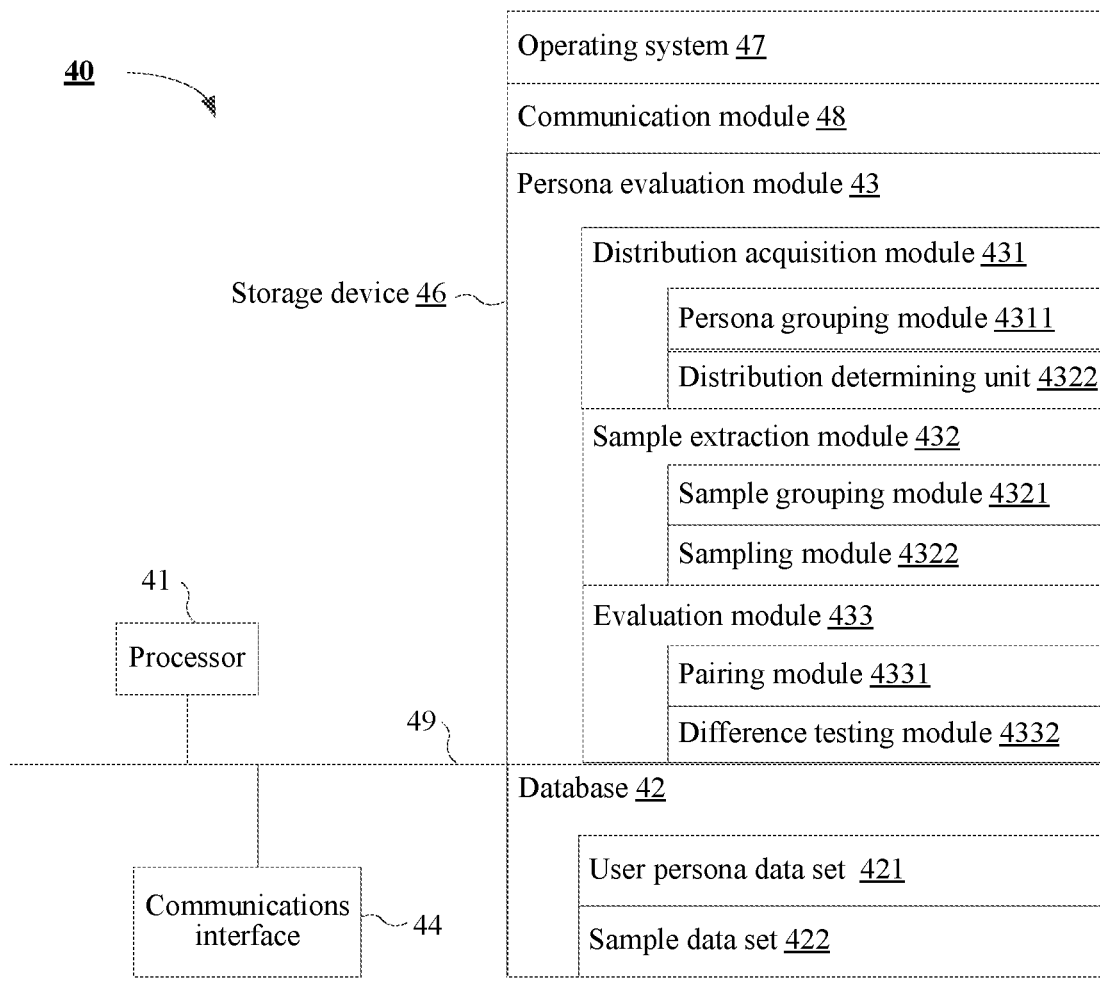
FIG. 4 is a system for evaluating user persona data according to one embodiment of the present disclosure.

Each embodiment of this application further provides a system for evaluating user persona data, which can perform the method for evaluating user persona data in each embodiment. FIG. 4 is a schematic view of the system for evaluating user persona data according to one embodiment of the present disclosure. As shown in FIG. 4, the system 40 includes a processor 41, a communications interface 44, a storage device 46, and a bus 49. The storage device 46 includes an operating system 47, a communications module 48, a database 42, and a persona evaluation module 43.

There may be one or more processors 41 that are distributed in a same physical device or multiple physical devices.

The system 40 acquires data through a certain communications connection through the communications interface 44, for example, user persona data and sample data, and an evaluation result can be provided to other devices via a certain communications connection through the communications interface. The communications connection may be wired or wireless, and may also be direct connection or network connection, and the network may be a local area network or Internet, and the communications interface 44 can support a corresponding communications protocol.

The database 112 stores various data, for example, a user persona data set 421 and a sample data set 422.

The persona evaluation module 43 includes a distribution acquisition module 431, a sample extraction module 432, and an evaluation module 433.

The distribution acquisition module 431 acquires distribution information of the user persona data set in at least one first dimension.

The sample extraction module 432 extracts an evaluation data set from a sample data set according to the distribution information, and the distribution of the data in the evaluation data set in the at least one first dimension is consistent with the distribution described by the distribution information.

The evaluation module 433 can use the data of the evaluation data set in a second dimension to acquire an accuracy rate of the data of the user persona data set in the second dimension.

In some examples, the distribution acquisition module 431 includes a persona grouping module 4311 and a distribution determining unit 4312.

The persona grouping module 4311 distributes the data of each user in the user persona data set into multiple persona data groups according to the values of the data in the at least one first dimension, and the multiple persona data groups are corresponding to different value ranges.

The distribution determining unit 4312 acquires the distribution information according to the user information in each persona data group, and the distribution information describes distribution of each user in various value ranges in the at least one first dimension.

At this time, the sample extraction module 432 includes a sample grouping module 4321 and a sampling module 4322.

The sample grouping module 4321 distributes the data of each user in the sample data set into multiple evaluation data groups according to the values of the data in the at least one first dimension, and the multiple evaluation data groups are corresponding to different value ranges.

The sampling module 4322 extracts user data from each evaluation data group according to the distribution information, and use the extracted user data to compose the evaluation data set.

In some examples, the distribution information describes the number of users distributed in various value ranges of the at least one first dimension, the sampling module 4322 determines a sampling proportion according to the number of users distributed in various value ranges and the number of users in each evaluation data group; and determine the number of users that need to be extracted from the evaluation data group corresponding to each value range according to the number of users distributed in various value ranges and the sampling proportion.

In some example, the sampling proportion can be one of the following values:

the first ratio at a preset position after arranging ratios of the number of users in each evaluation data group to the number of users in a corresponding persona data group in a descending order; or a smaller value of the ratio of the preset number of expected samples to the number of users in the user persona data set and the first ratio.

In some examples, the evaluation module 433 can include a pairing module 4331 and a difference testing module 4332.

The pairing module 4331 is configured to select persona data of a user that has a same user identifier as each user in the evaluation data set from the user persona data set, and use the persona data of each user and the evaluation data of the user in the evaluation data set to compose a sample pair corresponding to the user.

The difference testing module 4332 acquires an accuracy rate of the data in the user persona data set in the second dimension according to the difference between persona data and evaluation data in each sample pair in the second dimension.

In some examples, the difference testing module 4332 compares the difference and a preset threshold and determines an accuracy rate according to a comparison result.

In some examples, the difference testing module 4332 acquires one of the following differences as the difference between persona data and evaluation data in each sample pair in the second dimension:

a difference between the average value of the persona data and the average data of the evaluation data in the second dimension;

a difference between the variance of the persona data and the variance of the evaluation data in the second dimension;

a difference between the percentage of various values of the persona data and the percentage of various data of the evaluation data in the second dimension; and a difference between a first data group composed by the data of the persona data of each user in the sample pair in the second dimension and a second data group composed by of the data of the evaluation data of each user in the second dimension.

It should be noted that, not all steps and modules in the aforementioned flow and structural diagram are necessary, and some steps and modules can be neglected according to actual need. The sequence of performing each step is not unchanged, and can be adjusted according to demand. Division of each module is for describing the functions conveniently. During actual implementation, one module can be realized by multiple modules, and the functions of multiple modules can also be realized by one module, these modules can be located in a same device or different devices. In addition, the terms "the first" and "the second" in the aforementioned description are to distinguish two objects of the same meaning conveniently and are not significantly different.

In various embodiments of this application, each module can be realized by dedicated hardware or hardware executing readable instructions of a machine. For example, the hardware can be a specially designed permanent circuit or logic device (for example, a dedicated processor such as FPGA and ASIC) for finishing specific operations. The hardware can also include a programmable logic device or circuit configured by software temporarily (for example, including a general processor or other programmable processors) for performing specific operations.

The machine readable instructions corresponding to each module in the accompanying drawings of this application can enable an operating system running in a computer to finish partial or all operations described in each embodiment of this application. A non-volatile computer readable storage medium can be a storage inserted in an extension board of a computer or written into a storage in an extension unit connected to a computer. A CPU installed on an extension board or extension unit can perform partial or all actual operations according to instructions.

The non-volatile computer readable storage medium includes a floppy disk, a hard disk, a magneto-optical disk, an optical disk (such as CD-ROM, CD-R, CD-RW, DVD-ROM, DVD-RAM, DVD-RW, and DVD+RW), a tape, a non-volatile storage card, and ROM. Optionally, program codes can be downloaded from a server computer via a communications network.

In view of the above, the scope of the claims should not be limited to the embodiments described in the examples, and shall be interpreted widely according to the description as a whole.

What is claimed is:

1. A method for information processing, the method comprising:

acquiring, by processing circuitry of an information processing apparatus, distribution information in a first attribute dimension from a persona data collection extracted by a network service from user information of users who use the network service, the first attribute dimension being a combination of attributes of the users including at least genders, ages, and locations of the users, the persona data collection including persona data sets corresponding to the users;

extracting, from a sample data collection that is collected from sample users by another source different from the network service, an evaluation data collection to match the distribution information in the first attribute dimension, the sample data collection including sample data sets corresponding to the sample users;

selecting (i) persona data of a user from the persona data sets and (ii) sample data of the same user from the sample data sets;

comparing the persona data and the sample data of the same user in a second attribute dimension that is different from the first attribute dimension;

detecting a difference between the persona data and the sample data of the same user in the second attribute dimension based on the comparison; and determining a level of accuracy of the persona data collection in the second attribute dimension based on the difference, wherein multi-aspect information of the users is acquired based on the persona data collection and the determined level of accuracy.

2. The method according to claim 1, wherein the acquiring the distribution information in the first attribute dimension from the persona data collection comprises:

distributing the users into multiple persona data groups according to first values of the corresponding persona data sets in the first attribute dimension, the multiple persona data groups corresponding to multiple first ranges in the first attribute dimension; and acquiring the distribution information based on the distribution of the users in the multiple persona data groups.

3. The method according to claim 2, wherein the extracting the evaluation data collection to match the distribution information in the first attribute dimension comprises:

distributing the sample users into multiple evaluation data groups according to second values of the corresponding sample data sets in the first attribute dimension, the multiple evaluation data groups corresponding to multiple second ranges in the first attribute dimension;

selecting a subset of the sample users according to the distribution information; and forming the evaluation data collection using a subset of the sample data sets corresponding to the subset of the sample users.

4. The method according to claim 3, wherein each of the multiple evaluation data groups corresponds to a different one of the multiple persona data groups.

5. The method according to claim 4, further comprising:

determining a sampling ratio according to first numbers of the distributed users in the multiple persona data groups and second numbers of the distributed sample users in the multiple evaluation data groups that correspond to the multiple personal persona data groups; and determining a number of the distributed sample users to be selected from an evaluation data group of the multiple evaluation data groups based on the sampling ratio and a number of the distributed users in a persona data group of the multiple persona data groups that corresponds to the evaluation data group.

6. The method according to claim 5, wherein the determining the sampling ratio according to the first numbers of the distributed users in the multiple persona data groups and the second numbers of the distributed sample users in the multiple evaluation data groups that correspond to the multiple persona data groups further comprises:
- calculating respective ratios of the second numbers of the distributed sample users to the corresponding first numbers of the distributed users;
- sorting the ratios in an order; and
- selecting the sampling ratio at a preset position in the order.

7. The method according to claim 5, wherein the determining the sampling ratio according to the first numbers of the distributed users in the multiple persona data groups and the second numbers of the distributed sample users in the multiple evaluation data groups that correspond to the multiple persona data groups further comprises:
- calculating respective ratios of the second numbers of the distributed sample users to the corresponding first numbers of the distributed users;
- sorting the ratios in an order;
- selecting a first ratio at a preset position in the order;
- calculating a second ratio as a preset number of sample users expected to be selected from the sample data collection to a number of the users in the persona data collection; and
- selecting a smaller one of the first ratio and the second ratio as the sampling ratio.

8. The method according to claim 5, wherein the determining the number of the distributed sample users to be selected from the evaluation data group of the multiple evaluation data groups based on the sampling ratio and the number of the distributed users in the corresponding persona data group of the multiple persona data groups that corresponds to the evaluation data group comprises:
- calculating the number of the distributed sample users to be selected from the evaluation data group as a product of the sampling ratio and the number of the distributed users in the persona data group.

9. The method according to claim 3, wherein the evaluation data collection includes the subset of the sample data sets corresponding to the subset of the sample users and the determining the level of accuracy of the persona data collection in the second attribute dimension comprises:
- for each sample user in the subset of the sample users,
  - determining a matching user from the users of the persona data collection, the matching user and the respective sample user having a same user identifier; and
  - forming a data set pair associated with the respective sample user, the data set pair including a sample data set in the evaluation data collection corresponding to the respective sample user and a persona data set in the persona data collection corresponding to the matching user; and
- determining the level of accuracy of the persona data collection in the second attribute dimension based on a difference in the second attribute dimension of the data set pairs, the data set pairs being associated with the subset of the sample users in the evaluation data collection and the matching users in the persona data collection that correspond to the subset of the sample users.

10. The method according to claim 9, wherein the determining the level of accuracy of the persona data collection in the second attribute dimension based on the difference in the second attribute dimension of the data set pairs comprises:
- determining a first difference between a first average value of a subset of the persona data sets associated with the matching users in the second attribute dimension and a second average value of the subset of the sample data sets in the second attribute dimension;
- determining a second difference between a first variance of the subset of the persona data sets in the second attribute dimension and a second variance of the subset of the sample data sets in the second attribute dimension;
- determining a third difference between a first percentage of values of the subset of the persona data sets in the second attribute dimension and a second percentage of values of the subset of the sample data sets in the second attribute dimension;
- determining a fourth difference between a first data group including the subset of the persona data sets in the second attribute dimension and a second data group including the subset of the sample data sets in the second attribute dimension; and
- determining the difference as one of the first difference, the second difference, the third difference, and the fourth difference.

11. The method according to claim 10, wherein the determining the level of accuracy of the persona data collection in the second attribute dimension comprises:
- comparing the difference in the second attribute dimension of the data set pairs and a preset threshold to obtain a comparison result; and
- determining the level of accuracy of the persona data collection in the second attribute dimension according to the comparison result.

12. An apparatus, comprising:
interface circuitry configured to:
- receive a persona data collection extracted by a network service from user information of users who use the network service: and
- receive a sample data collection that is collected from sample users by another source different from the network service;

processing circuitry configured to:
- acquire distribution information in a first attribute dimension from the persona data collection, the first attribute dimension being a combination of attributes of the users including at least genders, ages, and locations of the users, the persona data collection including persona data sets corresponding to the users;
- extract, from the sample data collection, an evaluation data collection to match the distribution information in the first attribute dimension, the sample data collection including sample data sets corresponding to the sample users;
- select (i) persona data of a user from the persona data sets and (ii) sample data of the same user from the sample data sets;
- compare the persona data and the sample data of the same user in a second attribute dimension that is different from the first attribute dimension;

detect a difference between the persona data and the sample data of the same user in the second attribute dimension based on the comparison; and determine a level of accuracy of the persona data collection in the second attribute dimension based on the difference, wherein multi-aspect information of the users is acquired based on the persona data collection and the determined level of accuracy.

13. The apparatus according to claim 12, wherein the processing circuitry is further configured to:

distribute the users into multiple persona data groups according to first values of the corresponding persona data sets in the first attribute dimension, the multiple persona data groups corresponding to multiple first ranges in the first attribute dimension;

acquire the distribution information based on distribution of the users in the multiple persona data groups;

distribute the sample users into multiple evaluation data groups according to second values of the corresponding sample data sets in the first attribute dimension, the multiple evaluation data groups corresponding to multiple second ranges in the first attribute dimension;

select a subset of the sample users according to the distribution information; and form the evaluation data collection using a subset of the sample data sets corresponding to the subset of the sample users.

14. The apparatus according to claim 13, wherein each of the multiple evaluation data groups corresponds to a different one of the multiple persona data groups.

15. The apparatus according to claim 14, wherein the processing circuitry is further configured to:

determine a sampling ratio according to first numbers of the distributed users in the multiple persona data groups and second numbers of the distributed sample users in the multiple evaluation data groups that correspond to the multiple persona data groups; and determine a number of distributed sample users to be selected from an evaluation data group of the multiple evaluation data groups based on the sampling ratio and a number of the distributed users in a persona data group of the multiple persona data groups that corresponds to the evaluation data group.

16. The apparatus according to claim 15, wherein the processing circuitry is further configured to:

calculate respective ratios of the second numbers of the distributed sample users to the corresponding first numbers of the distributed users;

sort the ratios in an order;

select a first ratio at a preset position in the order;

calculate a second ratio as a preset number of sample users expected to be selected from the sample data collection to a number of the users in the persona data collection; and select the sampling ratio to be the first ratio or a smaller one of the first ratio and the second ratio.

17. The apparatus according to claim 13, wherein the evaluation data collection includes the subset of the sample data sets corresponding to the subset of the sample users, and the processing circuitry is further configured to:

for each sample user in the subset of the sample users, determine a matching user from the users of the persona data collection, the matching user and the respective sample user having a same user identifier; and form a data set pair associated with the respective sample user, the data set pair including a sample data set in the evaluation data collection corresponding to the respective sample user and a persona data set in the persona data collection corresponding to the matching user; and determine the level of accuracy of the persona data collection in the second attribute dimension based on a difference in the second attribute dimension of the data set pairs, the data set pairs being associated with the subset of the sample users in the evaluation data collection and the matching users in the persona data collection that correspond to the subset of the sample users.

18. The apparatus according to claim 17, wherein the processing circuitry is further configured to:

determine a first difference between a first average value of a subset of the persona data sets associated with the matching users in the second attribute dimension and a second average value of the subset of the sample data sets in the second attribute dimension;

determine a second difference between a first variance of the subset of the persona data sets in the second attribute dimension and a second variance of the subset of the sample data sets in the second attribute dimension;

determine a third difference between a first percentage of values of the subset of the persona data sets in the second attribute dimension and a second percentage of values of the subset of the sample data sets in the second attribute dimension;

determine a fourth difference between a first data group including the subset of the persona data sets in the second attribute dimension and a second data group including the subset of the sample data sets in the second attribute dimension; and determine the difference as one of the first difference, the second difference, the third difference, and the fourth difference.

19. The apparatus according to claim 18, wherein the processing circuitry is further configured to:

compare the difference of in the second attribute dimension of the data set pairs and a preset threshold to obtain a comparison result; and determine the level of accuracy of the persona data collection in the second attribute dimension according to the comparison result.

20. A non-transitory computer-readable storage medium storing a program executable by a processor to perform a method comprising:

acquiring distribution information in a first attribute dimension from a persona data collection extracted by a network service from user information of users who use the network service, the first attribute dimension being a combination of attributes of the users including at least genders, ages, and locations of the users, the persona data collection including persona data sets corresponding to the users;

extracting, from a sample data collection that is collected from sample users by another source different from the network service, an evaluation data collection to match the distribution information in the first attribute dimension, the sample data collection including sample data sets corresponding to the sample users;

selecting (i) persona data of a user from the persona data sets and (ii) sample data of the same user from the sample data sets;

comparing the persona data and the sample data of the same user in a second attribute dimension that is different from the first attribute dimension;

detecting a difference between the persona data and the sample data of the same user in the second attribute dimension based on the comparison; and determining a level of accuracy of the persona data collection in the second attribute dimension based on the difference, wherein multi-aspect information of the users is acquired based on the persona data collection and the determined level of accuracy.

* * * * *